United States Patent
Reddipalli et al.

(10) Patent No.: US 10,664,321 B2
(45) Date of Patent: May 26, 2020

(54) APPARATUS AND METHOD FOR MULTITENANCY IN CLOUD ENVIRONMENTS FOR PROCESSING LARGE DATASETS

(71) Applicant: General Electric Company, Schenectady, NY (US)

(72) Inventors: Veera Kishore Reddipalli, San Ramon, CA (US); Diwakar Kasibhotla, San Ramon, CA (US); Qian Chen, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 15/787,472

(22) Filed: Oct. 18, 2017

(65) Prior Publication Data

US 2019/0114211 A1    Apr. 18, 2019

(51) Int. Cl.
G06F 9/46 (2006.01)
G06F 9/50 (2006.01)
G06F 21/62 (2013.01)

(52) U.S. Cl.
CPC ........ *G06F 9/5083* (2013.01); *G06F 21/6218* (2013.01)

(58) Field of Classification Search
None
See application file for complete search history.

(56) References Cited

U.S. PATENT DOCUMENTS

| 10,103,878 | B1 | 10/2018 | Sharifi Mehr |
| 2014/0075432 | A1 | 3/2014 | McGrath |
| 2017/0026361 | A1 | 1/2017 | Jayakumar |
| 2017/0104746 | A1 | 4/2017 | Nair |
| 2017/0272472 | A1 | 9/2017 | Adhar |
| 2017/0300697 | A1 | 10/2017 | Iyer |
| 2017/0373940 | A1 | 12/2017 | Shahab |
| 2018/0246812 | A1 | 8/2018 | Aronovich |
| 2019/0108116 | A1 | 4/2019 | Benes |
| 2019/0116170 | A1 | 4/2019 | Reddipalli |

OTHER PUBLICATIONS

Narayanan, Sudheesh. Securing Hadoop, Packt Publishing, Limited, 2013 [retrieved on Jul. 19, 2019]. ProQuest Ebook Central, V Retrieved from the Internet: <URL: https://ebookcentral.proquest.com/lib/uspto-ebooks/detail.action?docID=1561454.> Chapter 5 (Year: 2013).

Y. Yang and F. Bao, "Password Protected Credentials," 2010 International Conference on Multimedia Information Networking and Security, Nanjing, Jiangsu, 2010, pp. 541-545. [online][retrieved on Jul. 8, 2019]. Retrieved from: I EEEXplore (Year: 2010).

*Primary Examiner* — Gregory A Kessler

(74) *Attorney, Agent, or Firm* — Fitch Even Tabin & Flannery LLP

(57) ABSTRACT

A software analytic is associated with a software application that is being executed by a tenant. In aspects, the analytic is initiated and triggered from one of a plurality of software containers at an edge node. Each of the software containers at the edge node is provisioned and preconfigured with a resource usage for a single tenant. One of the plurality of software containers at the edge node is selected for use by the software analytic. Subsequently, tenant-specific data is obtained for the analytic utilizing the selected container. The tenant-specific data does not include data from any other tenant. The tenant-specific data and the analytic are then sent from the edge node to a cluster of nodes for execution at the cluster of nodes.

16 Claims, 3 Drawing Sheets

APPARATUS AND METHOD FOR MULTITENANCY IN CLOUD ENVIRONMENTS FOR PROCESSING LARGE DATASETS

CROSS REFERENCE TO RELATED APPLICATION

"Apparatus and Method for Containerization at a Cluster" having U.S. Ser. No. 15/787,400, which is being filed on the same date as the present application and which has its contents incorporated herein by reference in its entirety.

BACKGROUND OF THE INVENTION

Field of the Invention

The subject matter disclosed herein generally relates to a computer architecture for the execution of analytics on time series data obtained from industrial machines, and, more specifically, to ensuring that each tenant job is initiated and triggered from a specific docker container provisioned and preconfigured with the resource usage for the tenant.

Brief Description of the Related Art

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. Other types of industrial assets may include vehicles such as fleets of trucks. The design and implementation of these assets often takes into account both the physics of the task at hand, as well as the environment in which such assets are configured to operate.

In an Internet of Things (IoT) environment, data is analyzed and monitored by various types of processing devices for event detection (e.g., anomaly detection) and the prediction of future events. In such cases, the processing devices need to support the analysis of very large datasets ("big data") by providing high amounts of computing power. Typically, to efficiently leverage the computing power in a multi-tenant environment, the computing power is shared between tenants.

Unfortunately, when the computing power is shared between tenants, one tenant or customer may take enough of the overall computing power that the computing jobs of other tenants or customers are slowed or halted. This may result in delays at providing timely results, and also leads to lost efficiency in the system.

BRIEF DESCRIPTION OF THE INVENTION

The present invention is directed to dockerizing the analytics being submitted to a cluster so that each tenant job is initiated and triggered from a specific docker container provisioned and preconfigured with the resource usage for a particular tenant.

In many of these embodiments, a software analytic is executed. The analytic is associated with a software application that is being executed by a tenant. In aspects, the analytic is initiated and triggered from one of a plurality of software containers at an edge node. Each of the software containers at the edge node is provisioned and preconfigured with a resource usage for a single tenant.

One of the plurality of software containers at the edge node is selected for use by the software analytic. Subsequently, tenant-specific data is obtained for the analytic utilizing the selected container. The tenant-specific data does not include data from any other tenant. The tenant-specific data and the analytic are then sent from the edge node to a cluster of nodes for execution at the cluster of nodes.

In examples, the execution of the analytic at the cluster of nodes obtains or utilizes software files, and the software files include data and/or executable code.

In other aspects, an IP address and security credentials are utilized by the edge node to obtain the tenant-specific data. In examples, the security credentials include a password or a key.

In still other aspects, the cluster comprises a plurality of cluster containers. In some examples, each of the cluster containers is configured to execute analytics and obtain data for multiple tenants. In yet other examples, each of the cluster containers is configured to execute analytics and obtain data for a single tenant.

In still others of these embodiment, a system includes an application program, a cluster, and an edge node. The application program programmatically causes a software analytic to be executed, and the analytic is associated with a tenant. The edge node is coupled to the cluster. The edge node comprises a plurality of software containers, and is configured to initiate and trigger the analytic from one of the plurality of software containers. Each of the software containers at the edge node is provisioned and preconfigured with a resource usage for a single tenant. The edge node is configured to select a software container to hold the analytic. Tenant-specific data is subsequently obtained for the analytic utilizing the selected container. The edge node is configured to send the obtained tenant-specific data and the analytic to the cluster.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

In the present approaches, a framework or architecture that supports multi-tenancy processing is provided. This architecture is provided at least in part by the dockertizing of analytics being submitted so that jobs of each tenant will be initiated and triggered from a specific docker container that is provisioned and preconfigured with the resource usage requirements of a particular client. The invention solves the noisy neighbor problem where one tenant can slow down the jobs of other tenants. Thus, the invention increases the speed and efficiency of data processing.

It will be appreciated that the approaches described herein can be deployed at various locations or combinations of locations. In one example, the edge node and the cluster are deployed at the cloud. In another example, the edge node and the cluster may be deployed at a local operating environment such as an industrial site. In still other examples, the edge node may be deployed at a local site and the cluster may be deployed at the cloud. In any case, the needs of specific tenants are isolated and customized such that data from each of these tenants is protected from unauthorized use.

In aspects, a software application that is being executed by a user desires to execute or requires the execution of a software analytic. The analytic (e.g., a rule or set of rules) may, for instance, examine the number of binary 1s and 0s from a sensor for one day from a windmill. In one example, 100 zeros indicate 100 MW of power has been generated by the windmill, and 50 zeros/50 ones indicate 50 MW of power has been generated.

The data from or used by different customers varies. The analytic obtains the correct customer-specific data at the edge node for each customer or tenant. The analytic needs only a certain customer's data, since it is improper to share data. To obtain the data, the edge node may have the IP address and the credentials of the tenant and uses this to obtain the correct data.

After the data is obtained is obtained at the edge node, the data (or other resources) is transmitted along with the analytic to the cluster. Each node on the cluster may execute jobs of different tenants (e.g., customers) or the same tenants.

Figure 1:
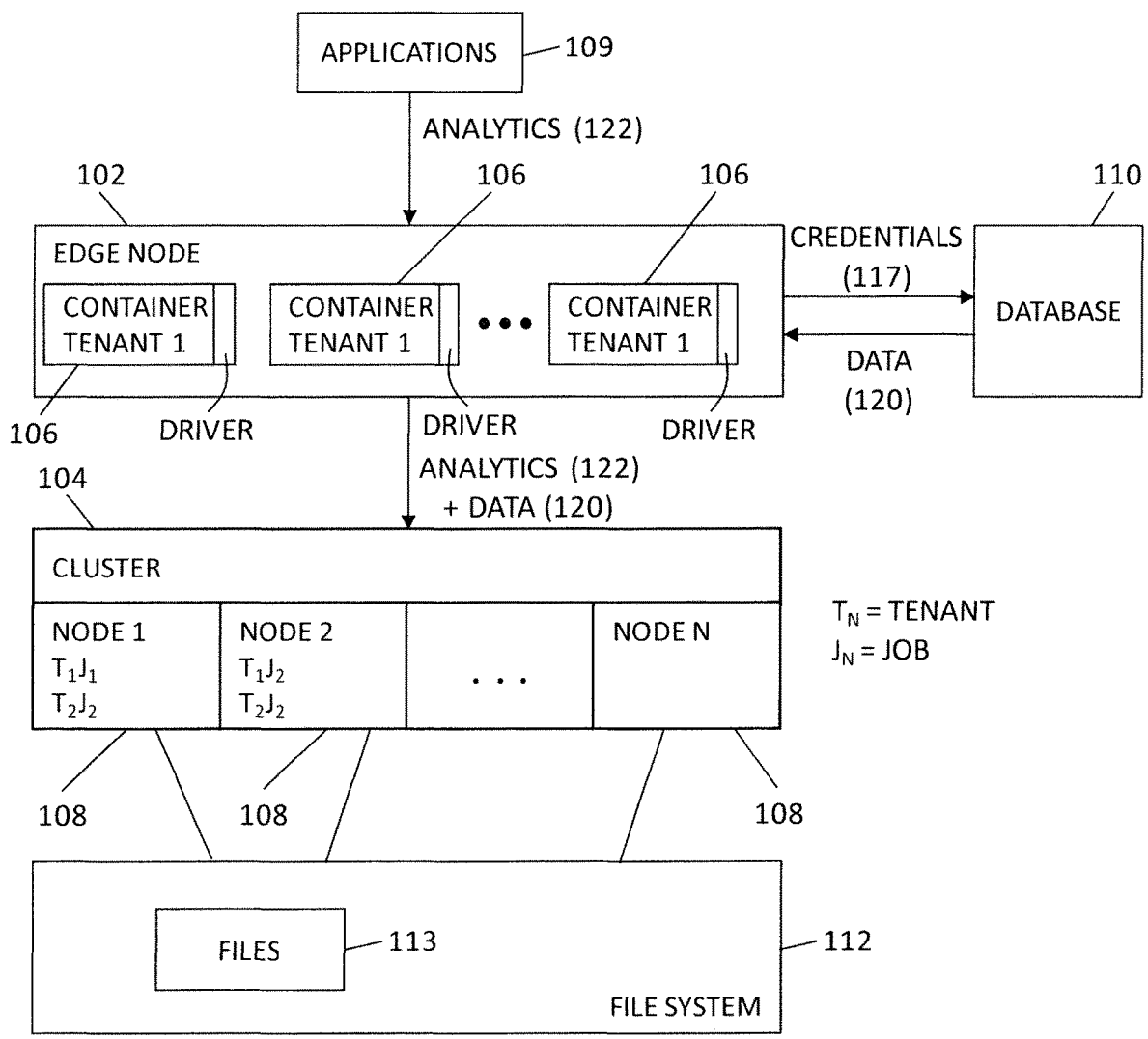
FIG. 1 comprises a block diagram of a system providing multitenancy processing according to various embodiments of the present invention.

Referring now to FIG. 1, one example of a system 100 that provides multitenancy processing at an edge node is described. The system 100 includes an edge node 102 and a cluster 104.

The cluster 104 includes one or more software nodes 108, and is communicatively coupled to the edge node 102. Each of the nodes 108 executes analytics from one or more tenants. Execution of the analytics causes files 113 being accessed from a file system 112. In examples, the files 113 include data files or executable code files.

For example, Node 1 may execute job T1J1 1(job 1 for tenant 1) and job T2J2 (Job 2 for Tenant 2). Node 2 may execute job T1J2 (Job 2 for tenant 1) and job T2J1 (Job 1 for tenant 2). Each of the jobs may involve the execution of one or more software analytics. The analytics may perform various functions, for example, counting the number of binary ones and zeros in data.

The edge node 102 also includes one or more containers 106. The edge node 102 communicates with a database 110. Although one edge node 102 and cluster 104 are shown in FIG. 1, it will be appreciated that multiple edge nodes and/or clusters may be used.

The edge node 102 is configured to obtain tenant-specific data 120 required for use by a software analytic 122 (which may be received from an application 109. The edge node 102 can be thought of as a staging area for initially obtaining and/or storing analytics and data.

The edge node 102 may be implemented on the same or different processor that the cluster 104. When the edge node 102 is implemented on the same control circuit or processor as the cluster 104, the edge node 102 is logically or virtually separate from the cluster 104. Various techniques known to those skilled in the art can ensure the virtual/logical separation of the elements. In other cases, edge node 102 and the cluster 104 are implemented on physically separate and different control circuits or processors.

The application 109 may be software that is utilized by different users. This application software 109 utilizes analytics 122. Analytics 122 perform different types of tasks such as counting the number of binary ones and zeros in a data streams. Analytics 122 are utilized and applied to data created by different types of industrial machines.

The software containers 106 are software processes or instances of software that access the database 110. The containers 106 may use security credentials of tenants to access and obtain data in the database 110.

The cluster 104 is formed of the software containers 108. The software containers 108 are software processes or instances of software.

The database 110 is any type of memory storage device. In examples, the database stores time series data that is obtained from industrial machines. Time series data may include measurements of parameters such as temperatures, pressures, or velocities. Other examples of time series data are possible. As used herein, "tenant" refers to a specific user and may be a person, an organization (e.g., a school, class, or business to mention a few examples), group of people, or group of organizations.

In one example of the operation of the system of FIG. 1, the application program 109 programmatically causes the software analytic 122 to be executed, and the analytic 122 is associated with a tenant. The edge node 102 is coupled to the cluster 104. The software containers 106 are configured to initiate and trigger the analytic. Each of the software containers 106 at the edge node 102 is provisioned and preconfigured with a resource usage for a single tenant. Resource usage may include the identity of the tenant, security credentials, processing speeds, and memory storage requirements of a tenant.

The edge node 102 is configured to select a software container 106 to temporarily hold or store the analytic 122. Tenant-specific data 120 is subsequently obtained for the analytic 122 utilizing the selected container 106. The edge node 102 is configured to send the obtained tenant-specific data 120 and the analytic 122 to the cluster 104.

In other aspects, the edge node 102 utilizes an IP address and security credentials 117 may be used to obtain the tenant-specific data. In examples, the security credentials 117 include a password or a key. In this case, the IP address is accessed and the security credentials presented at the IP address to obtain the data. The data may, in examples, include time series data obtained from industrial machines.

The containers 106 and 108 described herein may be executed as computer instructions that are executed on or by one or more control circuits. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit may be configured (for example, by using corresponding programming stored in a memory as will be well understood by those skilled in the art) to carry out one or more of the steps, actions, and/or functions described herein.

Figure 2:
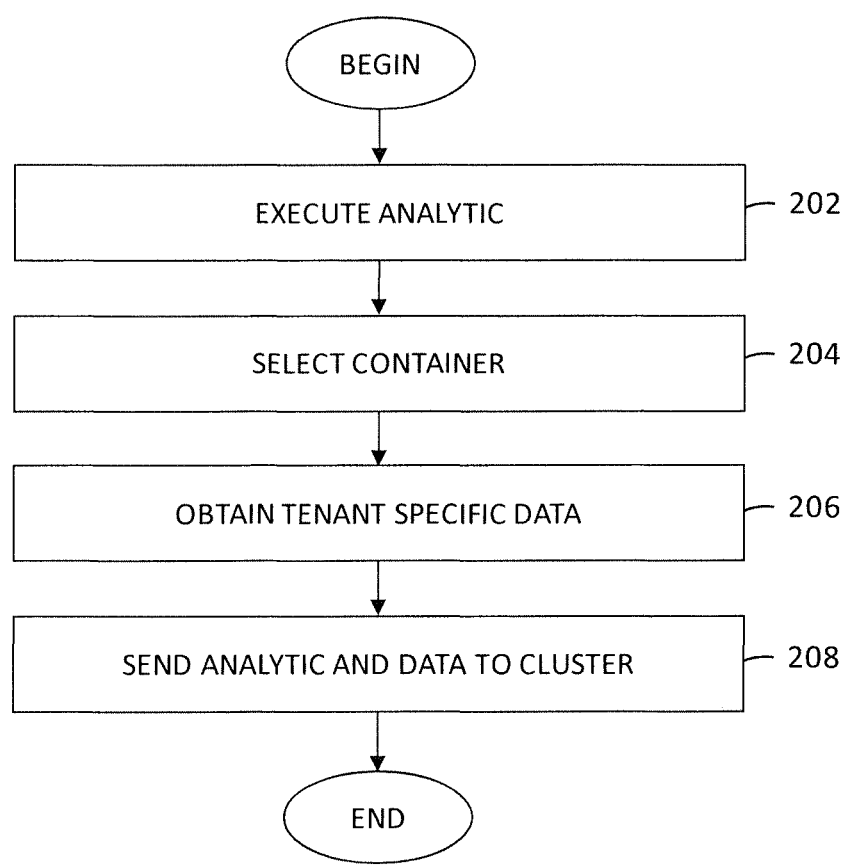
FIG. 2 comprises a flowchart of an approach for providing multitenancy processing according to various embodiments of the present invention.

Referring now to FIG. 2, one example of an approach that provides multitenancy processing at an edge node is described. It will be understood that the example of FIG. 2 is implemented according to a specific architecture and structure. An application may be executed at a control circuit, and the application includes or utilizes analytics. An edge node communicates with the analytic and a cluster communicates with the edge node. In examples, the edge node and the cluster may be deployed at the cloud, and the application may be executed locally such as at an industrial site. The application may communicate with the edge node via a network. The application may communicate directly with the edge node, but does not communicate directly with the cluster. The cluster communicates with a file system that stores files. The files may store data, may be executable code, or may be combinations of data and executable code.

At step 202, a software analytic is executed. The analytic is associated with a software application that is being executed by a tenant. In aspects, the analytic is initiated and triggered from one of a plurality of software containers at an edge node. Each of the software containers at the edge node is provisioned and preconfigured with a resource usage for a single tenant.

At step 204, one of the plurality of software containers at the edge node is selected for use by the software analytic. Each of the containers is assigned to a particular tenant and the analytic is routed to the appropriate container.

Subsequently, at step 206, tenant-specific data is obtained for the analytic utilizing the selected container. The tenant-specific data does not include data from any other tenant. An IP address and security credentials stored at or associated with the container may be used to obtain the tenant-specific data. In examples, the security credentials include a password or a key. In this case, the IP address is accessed and the security credentials presented at the IP address to obtain the data.

At step 208, the tenant-specific data and the analytic are then sent from the edge node to a cluster of nodes for execution at the cluster of nodes. Within the cluster are specific nodes. Each node may be implemented as a separate control circuit (or processing element)>Alternatively, the nodes may be virtual nodes and implemented on the same control circuit or processing element.

The cluster of nodes may include containers. These containers may handle the analytics for any tenant. For example, the next available container may be assigned to an incoming analytic and data.

In other examples, the containers at the cluster may be assigned to specific tenant. In this case, the cluster may have containers organized and operated as is described in "Apparatus and Method for Containerization" having U.S. Ser. No. 15/787,400,which was filed on the same date as the present application and which has had its contents incorporated herein by reference in its entirety.

Figure 3:
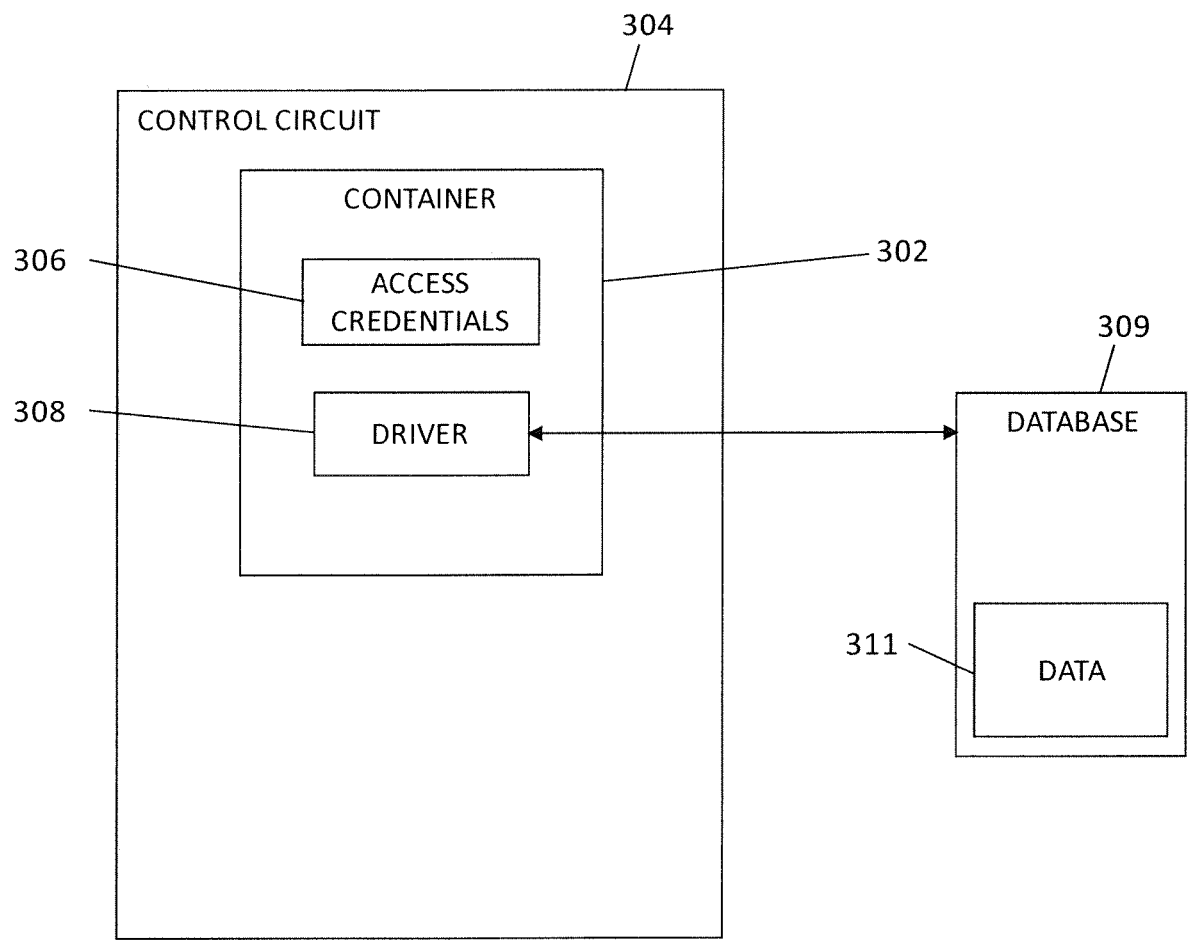
FIG. 3 comprises a block diagram of an edge node configured to provide multitenancy processing according to various embodiments of the present invention.

Referring now to FIG. 3, one example of a container 302 utilized at an edge node (e.g., the edge node 102 of FIG. 1) is described. The container 302 may be software or an instance of software that is executed on a control circuit 304. The container 302 includes access credentials 306 and a driver 308.

It will be appreciated that the container 302 may be a software construct. For example, the container 302 may be implemented as computer software (or an instance of computer software) that is executed at a control circuit.

In other aspects, the credentials 306 include a password or a key. For example, an IP address of a memory storage device is accessed and the security credentials presented at the IP address to obtain the data.

The driver 308 interfaces with a database 309 (e.g., the database 110 of FIG. 1). The driver 308 may present credentials 306 to the database 309 and receive the data 311 in response to the request. The credentials 306 may be stored in a memory storage unit as any appropriate structure such as a table.

It will be appreciated by those skilled in the art that modifications to the foregoing embodiments may be made in various aspects. Other variations clearly would also work, and are within the scope and spirit of the invention. It is deemed that the spirit and scope of the invention encompasses such modifications and alterations to the embodiments herein as would be apparent to one of ordinary skill in the art and familiar with the teachings of the present application.

What is claimed is:

1. A method of supporting multi-tenancy at an edge node, comprising:
   causing a software analytic to be executed, the analytic being utilized by a tenant;
   wherein the analytic is initiated and triggered from one of a plurality of software containers at an edge node, each of the software containers at the edge node being provisioned and preconfigured with a resource usage for a single tenant;
   selecting one of the plurality of software containers at the edge node for use by the software analytic;
   wherein the selecting is accomplished by one of:
   assigning the analytic to the next available container; or
   assigning the analytic to a container that has already been assigned to the analytic;
   subsequently, obtaining tenant-specific data for the analytic utilizing the selected container, the tenant-specific data not including data from any other tenant;
   sending the tenant-specific data and the analytic from the edge node to a cluster of nodes.

2. The method of claim 1, further comprising executing the analytic at the cluster.

3. The method of claim 2, where executing the analytic obtains files, and wherein the files include data or executable code.

4. The method of claim 1, wherein an IP address and security credentials are utilized by the edge node to obtain the tenant-specific data.

5. The method of claim 4, wherein the security credentials include a password or a key.

6. The method of claim 1, wherein the cluster comprises a plurality of cluster containers.

7. The method of claim 6, wherein each of the cluster containers is configured to execute analytics and obtain data for multiple tenants.

8. The method of claim 6, wherein each of the cluster containers is configured to execute analytics and obtain data for a single tenant.

9. A system of supporting multitenancy at an edge node, the system comprising:
   a hardware processor;
   an application program that programmatically causes a software analytic to be executed, the analytic being utilized by a tenant;
   a cluster implemented at the hardware processor;

an edge node implemented at the hardware processor and coupled to the cluster, the edge node comprising a plurality of software containers, the edge node configured to initiate and trigger the analytic from one of the plurality of software containers, each of the software containers at the edge node being provisioned and preconfigured with a resource usage for a single tenant, wherein the edge node is configured to select a software container to hold the analytic, wherein the selection is accomplished by one of: assigning the analytic to the next available container or assigning the analytic to a container that has already been assigned to the analytic; wherein tenant-specific data is subsequently obtained for the analytic utilizing the selected container, wherein the edge node is configured to send the obtained tenant-specific data and the analytic to the cluster.

10. The system of claim 9, the analytic is executed at the cluster.

11. The system of claim 10, where execution of the analytic obtains files, and wherein the files include data or executable code.

12. The system of claim 9, wherein an IP address and security credentials are utilized by the edge node to obtain the tenant-specific data.

13. The system of claim 12, wherein the security credentials include a password or a key.

14. The system of claim 9, wherein the cluster comprises a plurality of cluster containers.

15. The system of claim 14, wherein each of the cluster containers is configured to execute analytics and obtain data for multiple tenants.

16. The system of claim 14, wherein each of the cluster containers is configured to execute analytics and obtain data for a single tenant.

* * * * *